(12) United States Patent
Yokota et al.

(10) Patent No.: US 11,936,526 B2
(45) Date of Patent: Mar. 19, 2024

(54) NETWORK APPARATUS INFORMATION MANAGEMENT DEVICE AND NETWORK APPARATUS INFORMATION MANAGEMENT METHOD

(71) Applicant: Nippon Telegraph and Telephone Corporation, Tokyo (JP)

(72) Inventors: Masahiro Yokota, Tokyo (JP); Masatoshi Namiki, Tokyo (JP); Yuji Minato, Tokyo (JP); Masaaki Inami, Tokyo (JP); Daisaku Shimazaki, Tokyo (JP); Hideki Maeda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 466 days.

(21) Appl. No.: 17/255,019

(22) PCT Filed: Jun. 21, 2019

(86) PCT No.: PCT/JP2019/024650
§ 371 (c)(1),
(2) Date: Dec. 22, 2020

(87) PCT Pub. No.: WO2020/004248
PCT Pub. Date: Jan. 2, 2020

(65) Prior Publication Data
US 2021/0264352 A1  Aug. 26, 2021

(30) Foreign Application Priority Data
Jun. 27, 2018 (JP) .................. 2018-122064

(51) Int. Cl.
*H04L 41/0803* (2022.01)
*H04L 41/069* (2022.01)
(Continued)

(52) U.S. Cl.
CPC ........ *H04L 41/0856* (2013.01); *H04L 41/069* (2013.01); *H04L 41/0803* (2013.01); *H04L 41/0846* (2013.01)

(58) Field of Classification Search
CPC ......... H04L 41/085–0859; H04L 41/12; H04L 41/149; H04L 41/069; H04L 41/0604;
(Continued)

(56) References Cited

U.S. PATENT DOCUMENTS 9,922,539 B1 * 3/2018 Emigh .................. H04L 41/064
2004/0015957 A1 * 1/2004 Zara ...................... G06F 9/4411
717/121

(Continued)

FOREIGN PATENT DOCUMENTS

JP  2013-171471  9/2013

*Primary Examiner* — Gregory Todd
(74) *Attorney, Agent, or Firm* — Fish & Richardson P.C.

(57) ABSTRACT

The network device information management apparatus includes: a log data acquisition unit configured to acquire log data from each of the plurality of devices, the log data including information about components of the plurality of devices; and an inventory information estimation unit configured to exclude a common portion of the log data before and after registration of the component to extract a component configuration indicating information about the component newly registered to the device, compare the extracted component configuration with the component configuration extracted from a component registered to another device, estimate the common portion as inventory information, and store the estimated inventory information in storage means.

6 Claims, 6 Drawing Sheets

| DEVICE NAME | TYPE | USAGE START DATE AND TIME | INVENTORY INFORMATION | UPDATE HISTORY |
|---|---|---|---|---|
| DEVICE A | PKG 1G | 2018/1/1 12:00 | PKG TYPE: ○○ MODEL NO.: △△ VERSION: ×× | |
| DEVICE B | PKG 1G | 2018/2/1 13:00 | PKG TYPE: ○○ MODEL NO.: △△ VERSION: ×× | |
| ⋮ | ⋮ | ⋮ | ⋮ | ⋮ |

(51) Int. Cl.
*H04L 41/084* (2022.01)
*H04L 41/0853* (2022.01)

(58) Field of Classification Search
CPC . H04L 41/0613; H04L 43/04; H04L 41/0856; H04L 41/0853; H04L 41/0803; H04L 41/0846; H04L 41/0873; G06F 16/2358
See application file for complete search history.

(56) References Cited

U.S. PATENT DOCUMENTS

| | | | |
|---|---|---|---|
| 2010/0293263 A1* | 11/2010 | Caire | H04W 4/029 |
| | | | 709/223 |
| 2014/0146356 A1* | 5/2014 | Hirahara | G06F 3/1273 |
| | | | 358/1.15 |
| 2017/0046374 A1* | 2/2017 | Fletcher | G06F 9/542 |
| 2019/0158525 A1* | 5/2019 | Rostami-Hesarsorkh | |
| | | | H04L 63/1425 |
| 2020/0084178 A1* | 3/2020 | Dreyer | H04L 61/3025 |
| 2020/0379871 A1* | 12/2020 | Prakash | G06F 11/366 |

\* cited by examiner

(a) BEFORE ADDITION

```
EMS=aaa/ME=bbb/rack=1/shelf=1/slot=1
...
  "ccc-FPGA-1-1-1-1:ACT,..."        ⎫ REGION A
...                                 ⎭

"xx-1-1-1:,BAND=L,DIRECTION=D1,PKG_TYPE=A,..."   ⎫ REGION B
...                                                ⎭

112233445566778899900 18-01-01 12:00:00   ⎫
  M  1234567890 COMPLD                      ⎬ REGION C
...                                         ⎭
```

(b) AFTER ADDITION

```
EMS=aaa/ME=bbb/rack=1/shelf=1/slot=1
...
  "ccc-FPGA-1-1-1-1:ACT,..."                 ⎫
  "ddd-FPGA-1-1-1-2:ACT,..."                 ⎬ REGION A
...                                          ⎭

"xx-1-1-1:,BAND=L,DIRECTION=D1,PKG_TYPE=A,..."   ⎫ REGION B
...                                                ⎭

112233445566778899900 18-01-01 12:00:00   ⎫
  M  1234567890 COMPLD                      ⎬ REGION C
...                                         ⎭
```

Fig. 4

(a) BEFORE REGISTRATION

DEVICE NAME: A
PATH SETTING INFORMATION: bbb

TIME: tttt
COMMAND: ¥¥¥¥

(b) AFTER REGISTRATION

DEVICE NAME: A
PATH SETTING INFORMATION: bbb

SLOT NO.: □□
PKG TYPE: ○○
SERIAL NO.: **
MODEL NO.: △△
VERSION: × ×

TIME: tttt
COMMAND: ¥¥¥¥

Fig. 5

(a) DEVICE A

SLOT NO.: □□
PKG TYPE: ○○
SERIAL NO.: **
MODEL NO.: △△
VERSION: × ×

(b) DEVICE B

SLOT NO.: @@
PKG TYPE: ○○
SERIAL NO.: ##
MODEL NO.: △△
VERSION: × ×

Fig. 6

| DEVICE NAME | TYPE | USAGE START DATE AND TIME | INVENTORY INFORMATION | UPDATE HISTORY |
|---|---|---|---|---|
| DEVICE A | PKG 1G | 2018/1/1 12:00 | PKG TYPE : ○○<br>MODEL NO.: △△<br>VERSION: × × | |
| DEVICE B | PKG 1G | 2018/2/1 13:00 | PKG TYPE : ○○<br>MODEL NO.: △△<br>VERSION: × × | |
| ⋮ | ⋮ | ⋮ | ⋮ | ⋮ |

Fig. 7

| DEVICE NAME | TYPE | USAGE START DATE AND TIME | INVENTORY INFORMATION | UPDATE HISTORY |
|---|---|---|---|---|
| DEVICE A | PKG 1G | 2018/1/1 12:00 | PKG TYPE : ○○<br>MODEL NO.: △△<br>VERSION: × × | |
| DEVICE B | PKG 1G | 2018/3/1 14:00 | PKG TYPE : ○○<br>MODEL NO.: △△<br>VERSION : $ $ | DIFFERENCE OCCURS IN INVENTORY INFORMATION —31 |
| ⋮ | ⋮ | ⋮ | ⋮ | ⋮ |

NETWORK APPARATUS INFORMATION MANAGEMENT DEVICE AND NETWORK APPARATUS INFORMATION MANAGEMENT METHOD

CROSS-REFERENCE TO RELATED APPLICATIONS

This application is a National Stage application under 35 U.S.C. § 371 of International Application No. PCT/JP2019/024650, having an International Filing Date of Jun. 21, 2019, which claims priority to Japanese Application Serial No. 2018-122064, filed on Jun. 27, 2018. The disclosure of the prior application is considered part of the disclosure of this application, and is incorporated in its entirety into this application.

TECHNICAL FIELD

The present disclosure relates to a network device information management apparatus and a network device information management method that manage inventory information about devices connected to a network.

BACKGROUND ART

Traditionally, a technique has been developed to extract information included in a log required by a user without knowing log formatted generation rules generated by an apparatus in advance.

For example, in Patent Literature 1, a log message is acquired from a log data storage means, and scores are calculated based on a set of appearance frequencies with respect to the appearance position of each word included in the log message, the word, and the number of words included in the log message, and clustering is performed based on the scores so as to generate a template. In this case, the clustering-processed clusters are merged in the descending order of value, and the group of the words merged at a point of time when a value calculated by multiplying the total number of words of the log message by a predetermined threshold for determining the range of the cluster including important words is exceeded is defined as a template. The log messages of a plurality of devices are acquired and matched with the generated template to extract an important message.

CITATION LIST

Patent Literature

Patent Literature 1: JP 2013-171471 A

SUMMARY OF THE INVENTION

Technical Problem

Although various devices are connected to network systems, including transmission systems, the network carrier may not disclose device inventory information.

When a component of the device is changed, if the network carrier discloses the inventory information of the device, the component change can be noticed based on a difference. However, for some devices, only a vendor knows the inventory information, the confirmation method of which may not be disclosed. In such case, the carrier cannot know the change in a component.

When a device component change that cannot be found by the carrier (silent change) is made, identification of the cause of a failure due to the changed component becomes time-consuming, which can greatly affect commercial services.

In light of the foregoing, an object of some aspects of the disclosure is to know inventory information about a network device without vendor intervention.

Means for Solving the Problem

To achieve the object described above, according to aspect 1 of the present disclosure, provided is a network device information management apparatus for managing inventory information about a plurality of devices connected to a network, the apparatus including a log data acquisition unit configured to acquire log data from each of the plurality of devices, the log data including information about components that each of the devices has; and an inventory information estimation unit configured to, by excluding a common portion of the log data before and after registration of the components, extract a component configuration indicating information about the component newly registered to the device, compare the extracted component configuration with a component configuration extracted from a component registered to another device, estimate the common portion as inventory information, and store the estimated inventory information in a storage means.

According to aspect 4 of the present disclosure, provided is a network device information management method performed by a network device information management apparatus configured to manage inventory information about a plurality of devices connected to a network, the network device information management apparatus is configured to execute steps of acquiring log data from each of the plurality of devices, the log data including information about components that each of the plurality of devices has; and by excluding a common portion of the log data before and after registration of the components, extracting a component configuration indicating information about the component newly registered to the device, comparing the extracted component configuration with a component configuration extracted from a component registered to another device, estimating the common portion as inventory information, and storing the estimated inventory information in storage means.

In this way, even when the inventory information about the device is not disclosed, the device component configuration can be extracted from the log data to estimate the inventory information. Thus, at the occurrence of a failure in the network, a cause for the failure can be quickly identified.

According to aspect 2 of the present disclosure, provided is the network device information management apparatus as in aspect 1, where after the inventory information is stored in the storage means, the log data acquisition unit acquires the log data from the devices at predetermined time intervals, and the apparatus further includes an inventory information update unit configured to determine whether the component configuration of the devices is changed using the acquired log data and the inventory information stored in the storage means, and update the inventory information in accordance with the acquired log data when the component configuration is changed.

According to aspect 5 of the present disclosure, provided is the network device information management method as in 4, wherein the network device information management apparatus is configured to further execute steps of, after the inventory information is stored in the storage means, acquiring the log data from the devices at predetermined time intervals; and determining whether the component configuration of the devices is changed using the acquired log data and the inventory information stored in the storage means, and updating the inventory information in accordance with the acquired log data when the component configuration is changed.

With this configuration, changes (including replacement, addition, and the like) of the components after the onset of the operation of the devices can be continuously detected.

According to aspect 3 of the present disclosure, provided is the network device information management apparatus as in aspect 2, where the inventory information update unit stores an update history associated with the updated inventory information when the inventory information stored in the storage means is updated.

Further, according to aspect 6 of the present disclosure, provided is the network device information management method as in aspect 5, where the network device information management apparatus is configured to execute a step of storing an update history associated with the updated inventory information when the inventory information stored in the storage means is updated.

With this configuration, it is possible to easily identify a device with the component changed or the changed component, thereby identifying a failure location at the occurrence of a failure more quickly.

Effects of the Invention

According to some aspects of the present disclosure, inventory information about a network device can be known without vendor intervention.

DESCRIPTION OF EMBODIMENTS

Hereinafter, a preferred embodiment (hereinafter referred to as an embodiment) of a network device information management apparatus 20 and a network device information management method according to some aspects of the present disclosure will be described in detail with reference to accompanying drawings.

Figure 1:
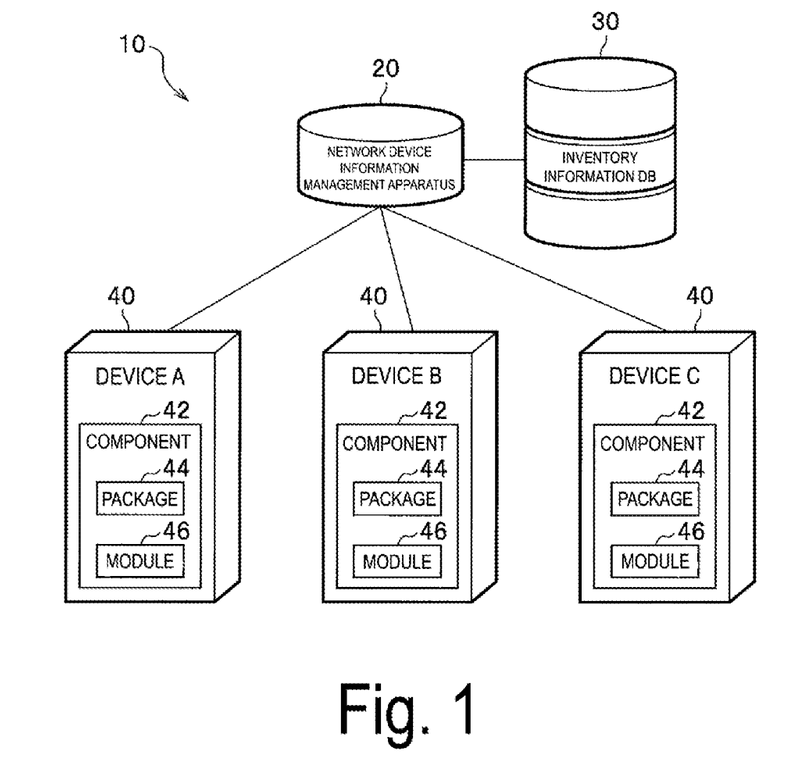
FIG. 1 is a diagram illustrating a configuration of a network system according to a present embodiment.

FIG. 1 is a diagram illustrating a configuration of a network system 10 according to the present embodiment.

The network system 10 includes a network device information management apparatus 20, an inventory information database (DB) 30, and a plurality of devices 40.

The network device information management apparatus 20 manages inventory information about each of the devices 40 connected to a network. The network device information management apparatus 20 is installed, for example, by a carrier of the network to which the devices 40 are connected.

The inventory information database (DB) 30 (storage means) stores Inventory information about each of the devices 40. The inventory information is information concerning components 42 mounted on each of the devices 40, and includes, for example, the type, the model number, the version, and the like of the components 42. This inventory information database 30 may be made as information stored in a storage means together with the network device information management apparatus 20 in a single housing, or may be made as information stored in a storage means that is a separate housing communicatively connected to the network device information management apparatus 20, as illustrated in FIG. 1.

By knowing the inventory information about each of the devices 40 on the network carrier side, at the occurrence of a failure, a failure location and a cause for the failure can be identified early.

The device 40 is a network device connected to the network provided by the carrier.

FIG. 1 illustrates a plurality of devices 40 (devices A, B, and C).

Each of the devices 40 includes a package 44 and a module 46, for example, as the components 42 related to the connection of the network. The package 44 is an interface (interface package) used for connection between the devices 40, and the module 46 is a component used for transmission/reception of signals to/from parts mounted on the package 44 and the package 44 itself.

Figure 2:
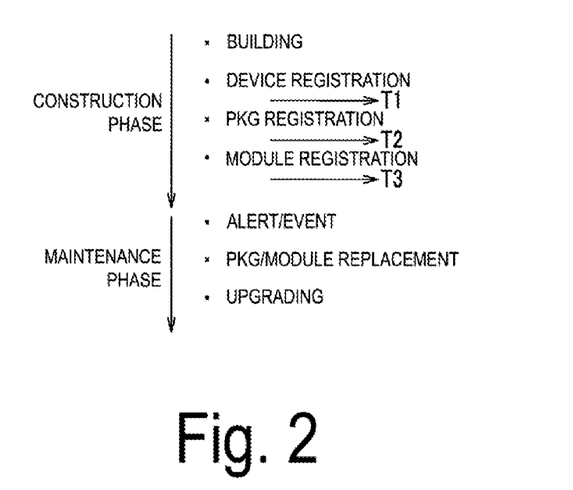
FIG. 2 is a diagram illustrating an example of an operation schedule of the network system.

The operation of the network system 10 is divided into a construction phase and a maintenance phase as illustrated in FIG. 2. In the construction phase, installation (building) of the devices 40, registration of the devices 40, registration of the packages 44 (PKG), registration of the modules 46, and the like are performed. In the maintenance phase, alarm/event, replacement of the package 44 or the module 46, upgrading and the like are performed.

Figure 3:
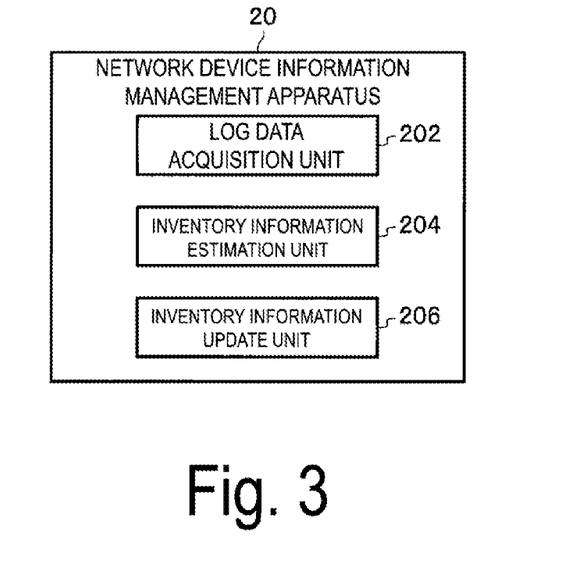
FIG. 3 is a block diagram illustrating a functional configuration of a network device information management apparatus according to the present embodiment.

FIG. 3 is a block diagram illustrating a functional configuration of the network device information management apparatus 20.

The network device information management apparatus 20 is made as a computer or the like provided with control means, storage means, and input/output means (not illustrated). The control means then includes a log data acquisition unit 202, an inventory information estimation unit 204, and an inventory information update unit 206.

The log data acquisition unit 202 acquires log data including information about the components 42 that the devices 40 have from the devices 40.

Figure 4:
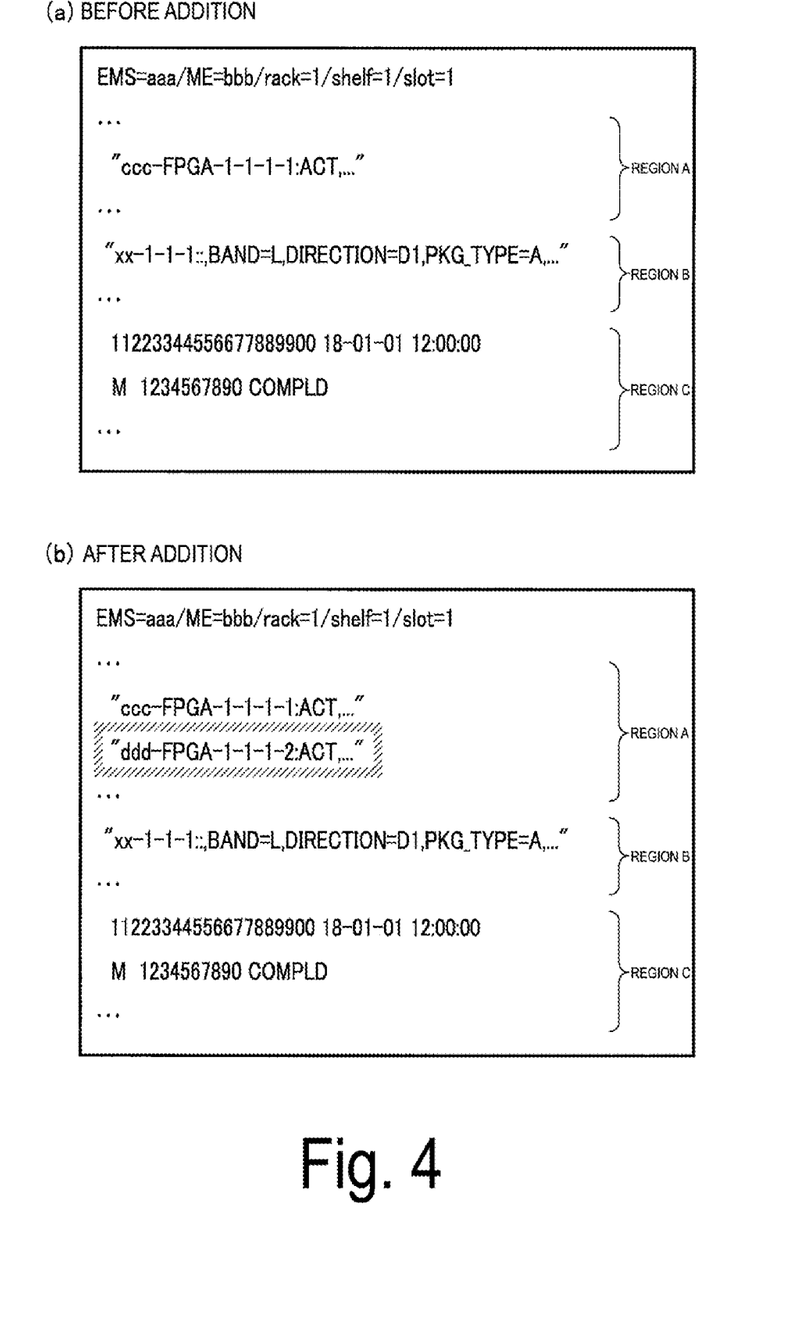
FIG. 4 is a diagram illustrating an example of log data.

FIG. 4 is diagrams illustrating an example of the log data. Note that FIGS. 4(a) and 4(b) are log data acquired from the same device 40 at a different timing (before and after registration of a new package 44).

Among the log data illustrated in FIG. 4, a region A is information about the component, a region B is path setting information, and a region C is a time and command log. The region A in FIG. 4(b) includes information corresponding to a newly registered package 44 ("component configuration" described below). Note that the network device information management apparatus 20 according to the present embodiment does not know the format of log data.

The log data acquisition unit 202 acquires the log data from the plurality of devices 40 multiple times at intervals in the construction phase illustrated in FIG. 2. Specifically, after registration of the device 40 (T1 in FIG. 2), after registration of the package 44 (T2 in FIG. 2), or after registration of the module 46 (T3 in FIG. 2), log data is acquired from the devices 40. Also, in the maintenance phase, log data is acquired at predetermined time intervals.

Note that the acquisition timing of the log data may be manually specified.

Returning to FIG. 3, the inventory information estimation unit 204 extracts the component configuration of the devices 40 using the log data acquired by the log data acquisition unit 202, and estimates the inventory information.

In the present embodiment, the inventory information estimation unit 204 identifies a common portion of multiple pieces of log data, and extracts a portion other than the common portion as the component configuration. Here, the component configuration refers to added information (portion surrounded with oblique lines in FIG. 4(b)) corresponding to a newly registered component (package, module, and the like), in the region A of the log data in FIG. 4(b) (information about the component).

Figure 5:
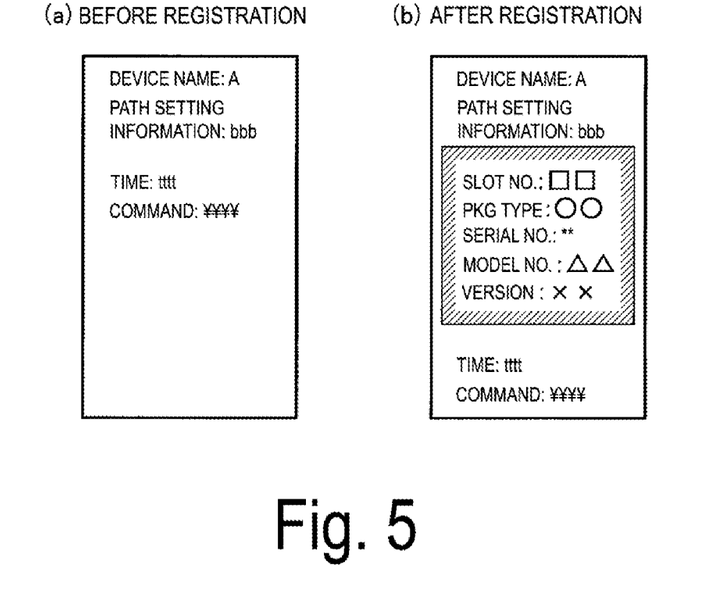
FIG. 5 is a diagram briefly illustrating contents of log data.

FIG. 5 illustrates the contents of the log data as illustrated in FIG. 4 more briefly. FIG. 5(a) illustrates log data acquired from a device A after registration of the device 40 (that is, before registration of the package 44) (T1 in FIG. 2), and FIG. 5(b) illustrates log data acquired from the device A after registration of the package 44 (T2 in FIG. 2).

The log data includes information about the components, information about signal path setting, time, and registration command log from a server.

Comparing FIG. 5(a) with FIG. 5(b), it can be noticed that information corresponding to a newly registered package 44 (portion surrounded with oblique lines) is added to FIG. 5(b). That is, even when the inventory information estimation unit 204 does not know the format of log data, the inventory information estimation unit 204 can extract the component configuration from component information about the component in the log data by excluding a common portion from the log data before and after registration of the components 42 including the package 44.

Figure 6:
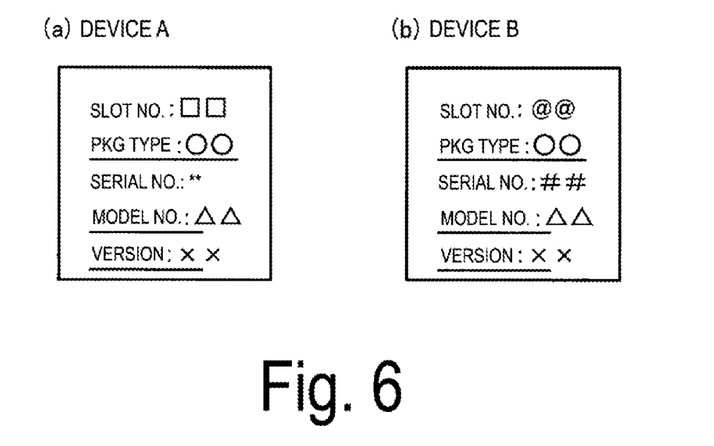
FIG. 6 is a diagram briefly illustrating contents of log data.

In FIG. 6, the component configuration is extracted using the log data acquired from different devices 40 (device A and device B).

The inventory information estimation unit 204 compares the component configurations of the devices 40 with each other, estimates a common portion as the inventory information, and stores the inventory information in the inventory information database 30.

For example, comparing FIG. 6(a) (data acquired from the device A) with FIG. 6(b) (data acquired from the device B), it can be noticed that the underlined package (PKG) type, model number, and version are the same, but the slot number and the serial number are different. Thus, the inventory information estimation unit 204 estimates the package type, the model number, and the version as the inventory information, and stores the estimated inventory information in the inventory information database 30.

Note that the inventory information portion in the log data may be manually designed based on design information, for example.

In addition, before introducing the device 40 into the commercial environment, the inventory information portion in the log data may be specified according to a confirmation result of a verification device.

Figure 7:
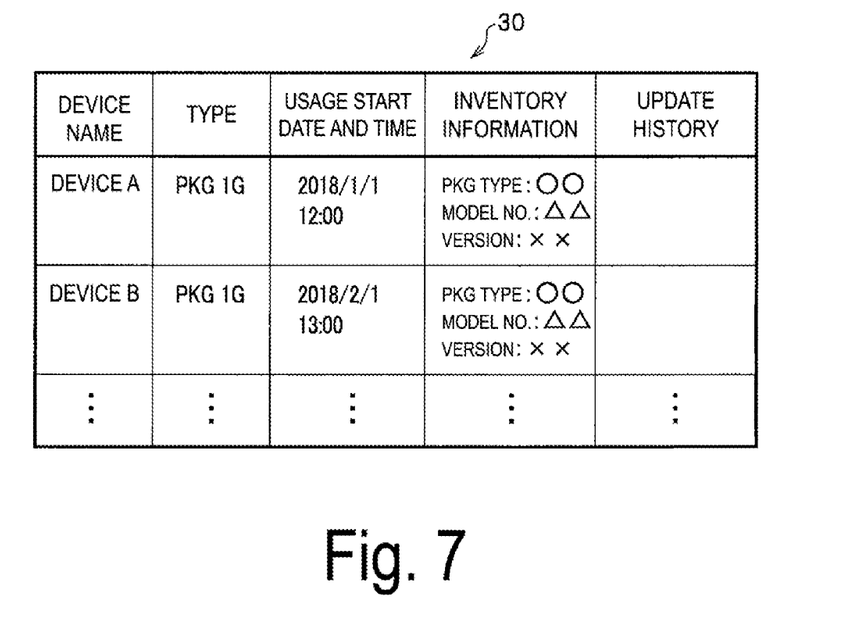
FIG. 7 is a table illustrating an example of an inventory information database.

FIG. 7 is a table illustrating an example of the inventory information database 30. The inventory information database 30 in FIG. 7 stores the name (device name) of the devices 40; the type of the component 42; the usage start date and time; inventory information such as the package (PKG) type, the model number, and the version; and the update history (details are described below). By storing the usage start date and time in the inventory information database 30, component failures caused by aged deterioration or the like can be predicted and isolated.

Note that in the type of component 42, "PKG 1 G" indicates the package 44 having a communication speed of 1 Gbp.

In addition, while FIG. 7 illustrates one piece of inventory information (particularly information about the package 44) for one device 40, the inventory information corresponding to the number of mounted components may certainly be stored.

Additionally, when a plurality of vendors is employed for each component 42, the component may be handled as distinct components 42.

In addition, when the method of describing log data changes due to upgrading of firmware or the like, the table of the inventory information database 30 is recreated.

Returning to FIG. 3, the inventory information update unit 206 determines whether or not the component configuration of the devices 40 changes according to the log data acquired by the log data acquisition unit 202 at the predetermined time intervals in the maintenance phase (see FIG. 2) and the current inventory information, and updates the inventory information when the component configuration changes.

In other words, when there is a difference between the current inventory information and the log data currently acquired, the inventory information update unit 206 determines that the component configuration is changed, and updates the inventory information (including addition or deletion).

For example, comparing log data before and after registration of the new package 44 illustrated in FIG. 4, as described above, the information corresponding to the newly added package 44 (the portion surrounded with the oblique lines) is added to the area A, which is the information about the component. Based on this information (component configuration), the inventory information update unit 206 detects the addition of the new package 44 to the device 40, and updates the inventory information (added in the example described above).

In addition, the inventory information update unit 206 stores the update history in the inventory information when the inventory information is updated. As a result, at the occurrence of a failure, a failure location and a cause for the failure can be identified more earlier.

Figure 8:
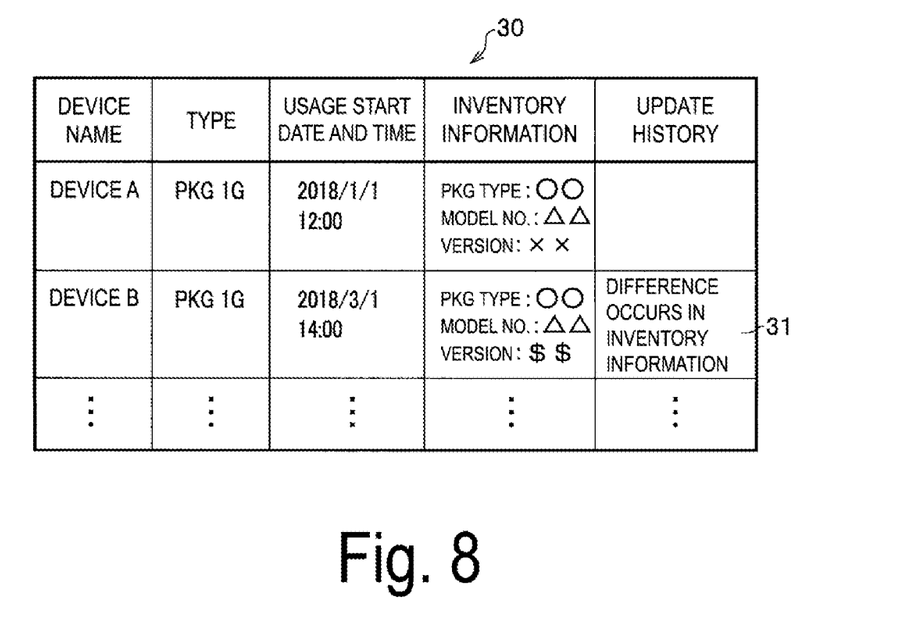
FIG. 8 is a table illustrating an example of an inventory information database after updating.

FIG. 8 is a table illustrating an example of the inventory information database 30 after updating.

Comparing the inventory information database with the inventory information database 30 illustrated in FIG. 7, the inventory information about the device B is changed. That is, it can be noticed that the package 44 of version: xx is replaced with the package 44 of version: $$ and the usage start date and time is postponed.

In addition, when a difference occurs in the inventory information, information "difference occurs in the inventory information" (a reference sign 31 in FIG. 8) is stored in the update history in the inventory information database 30. In this way, by storing the update history in the inventory information database 30, it is possible to quickly identify the device 40 with the component 42 being replaced or added, and the changed component.

In particular, prior to the occurrence of a failure, the network carrier may estimate any component change in the device 40 to prevent a failure.

Further, at the occurrence of a failure, the network carrier can ascertain a failure location or a cause of the failure without vendor intervention using the estimation result of the component change of the device 40, thereby minimizing the impact on commercial services.

Figure 9:
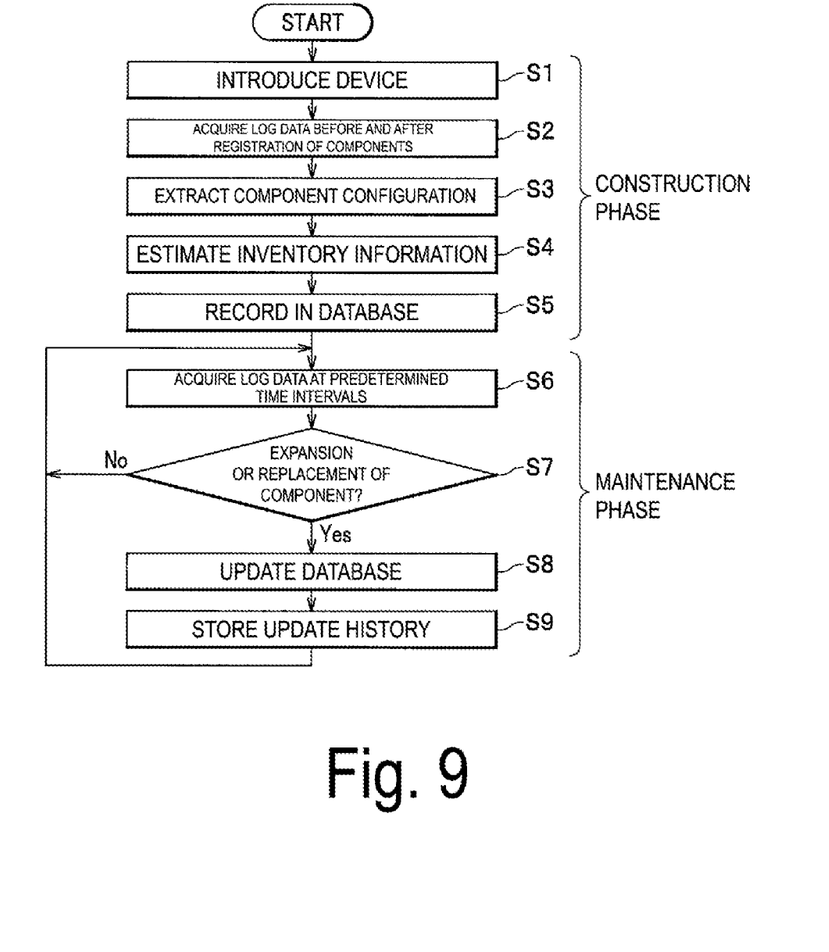
FIG. 9 is a flowchart illustrating a processing procedure of the network device information management apparatus according to the present embodiment.

FIG. 9 is a flowchart illustrating a processing procedure of the network device information management apparatus 20.

Steps S1 to S5 are processing in the construction phase (see FIG. 2), and steps S6 to S9 are processing in the maintenance phase (see FIG. 2).

When a new device 40 is introduced to the network system 10 (step S1), the log data acquisition unit 202 acquires log data from the device 40 at the timing before and after registration of the components 42 in the device 40 (step S2).

The inventory information estimation unit 204 extracts the component configuration by excluding the common portion from the plurality of pieces of acquired log data (before and after registration) (step S3).

In addition, the inventory information estimation unit 204 compares the component configurations in the log data acquired from the plurality of devices 40, and estimates the common portion as the inventory information (step S4).

Then, the inventory information estimation unit 204 stores the inventory information in the inventory information database 30 (step S5).

In the maintenance phase, the log data acquisition unit 202 acquires log data at predetermined time intervals (step S6).

Next, the inventory information update unit 206 compares the component configuration (inventory information) based on the log data acquired this time with the inventory information in the inventory information database 30, and determines whether or not there has been expansion, replacement, and the like of the component 42 (change in the component configuration of the device 40) (step S7).

When there is no change in the component configuration (inventory information) of the device 40 (step S7: No), the inventory information update unit 206 returns to step S6 to continue to monitor the log data.

On the contrary, when there is a change in the component configuration of the device 40 (step S7: Yes), the inventory information update unit 206 updates the table (inventory information) in the inventory information database 30 (step S8), and stores information about the update history of the inventory information in the inventory information database 30 (step S9). Then, returning to step S6, monitoring of log data continues.

As described above, according to the network device information management apparatus 20 and the network device information management method according to the present embodiment, even when the inventory information about the devices 40 is not disclosed, the component configuration of the devices 40 can be extracted from the log data to estimate the inventory information. Thus, at the occurrence of a failure in the network, a cause for the failure can be quickly identified.

REFERENCE SIGNS LIST

10 Network system
20 Network device information management apparatus
202 Log data acquisition unit
204 Inventory information estimation unit
206 Inventory information update unit
30 Inventory information database (storage means)
40 Device
42 Component
44 Package
46 Module

The invention claimed is:

1. A network device information management apparatus for managing inventory information about a plurality of devices connected to a network, the apparatus comprising one or more processors configured to:

for each device included in the plurality of devices,
acquire a first log data from the device at a first time, the first log data including information about components of the device;
acquire a second log data from the device at a second time that is later than the first time, wherein a new component is registered to the device during a time period between the first time and the second time;
determine a log data common portion between the first log data and the second log data;
extract a component configuration for the new component by excluding the log data common portion from the second log data;
compare the extracted component configuration with a second component configuration extracted from a second component registered to a second device;
determine a component configuration common portion between the extracted component configuration and the second component configuration, wherein the component configuration common portion comprises a package type, a model number, and a version number;
estimate the component configuration common portion as inventory information of the new component registered on the device; and
store the estimated inventory information of the new component registered on the device in a storage medium.

2. The network device information management apparatus according to claim 1, wherein
after the inventory information is stored in the storage medium, the apparatus is configured to acquire new log data from the devices at predetermined time intervals, and
the apparatus is further configured to determine whether the component configuration of the devices is changed using the acquired new log data and the inventory information stored in the storage medium, and update the inventory information in accordance with the acquired new log data when the component configuration is changed.

3. The network device information management apparatus according to claim 2, wherein the apparatus is configured to store an update history associated with the updated inventory information when the inventory information stored in the storage medium is updated.

4. A network device information management method performed by a network device information management apparatus configured to manage inventory information about a plurality of devices connected to a network, the network device information management apparatus is configured to execute:

for each device included in the plurality of devices, acquiring a first log data from the device at a first time, the first log data including information about components of the device;

acquiring a second log data from the device at a second time that is later than the first time, wherein a new component is registered to the device during a time period between the first time and the second time;

determining a log data common portion between the first log data and the second log data;

extracting a component configuration for the new component by excluding the log data common portion from the second log data;

comparing the extracted component configuration with a second component configuration extracted from a second component registered to a second device;

determine a component configuration common portion between the extracted component configuration and the second component configuration, wherein the component configuration common portion comprises a package type, a model number, and a version number;

estimating the component configuration common portion as inventory information of the new component registered on the device; and storing the estimated inventory information of the new component registered on the device in a storage medium.

5. The network device information management method according to claim 4, wherein the network device information management apparatus is configured to further execute:

after the inventory information is stored in the storage medium, acquiring new log data from the device at predetermined time intervals; and determining whether the component configuration of the devices is changed using the acquired new log data and the inventory information stored in the storage medium, and updating the inventory information in accordance with the acquired new log data when the component configuration is changed.

6. The network device information management method according to claim 5, wherein the network device information management apparatus is configured to execute storing an update history associated with the updated inventory information when the inventory information stored in the storage medium is updated.

* * * * *